(No Model.)  7 Sheets—Sheet 1.

F. H. RICHARDS.
WEIGHING MACHINE.

No. 589,279.  Patented Aug. 31, 1897.

Fig. 1.

Witnesses:
J. L. Edwards Jr.
Fred. J. Dole.

Inventor:
F. H. Richards.

(No Model.)  F. H. RICHARDS.  7 Sheets—Sheet 2.
WEIGHING MACHINE.

No. 589,279.  Patented Aug. 31, 1897.

Witnesses:
J. L. Edwards Jr.
Fred. J. Dole.

Inventor:
F. H. Richards.

(No Model.) 7 Sheets—Sheet 3.

F. H. RICHARDS.
WEIGHING MACHINE.

No. 589,279. Patented Aug. 31, 1897.

Witnesses:
J. L. Edwards Jr.
Fred. J. Dole.

Inventor:
F. H. Richards (No Model.)  F. H. RICHARDS.  7 Sheets—Sheet 4.
WEIGHING MACHINE.

No. 589,279.  Patented Aug. 31, 1897.

Fig. 4.

Witnesses:
J. L. Edwards Jr.
Fred. J. Dole.

Inventor:
F. H. Richards.

(No Model.) 7 Sheets—Sheet 5.

F. H. RICHARDS.
WEIGHING MACHINE.

No. 589,279. Patented Aug. 31, 1897.

Witnesses:
J. L. Edwards Jr.
Fred. J. Dole.

Inventor:
F. H. Richards (No Model.) 7 Sheets—Sheet 6.

F. H. RICHARDS.
WEIGHING MACHINE.

No. 589,279. Patented Aug. 31, 1897.

Witnesses:
J. L. Edwards Jr.
Fred. J. Dole.

Inventor:
F. H. Richards, (No Model.) 7 Sheets—Sheet 7.

F. H. RICHARDS.
WEIGHING MACHINE.

No. 589,279. Patented Aug. 31, 1897.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,279, dated August 31, 1897.

Application filed May 5, 1897. Serial No. 635,130. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, certain of the improvements being especially adapted to machines of the kind disclosed by Letters Patent No. 572,067, granted to me November 24, 1896.

One of the objects of the invention is to provide means for delivering a supply of material to the load-receiver, said means including in its preferred form a supply-hopper and a stream-controller having a plurality of cut-offs supported for rotation and intermittently actuated by a device on the weighing mechanism, so that at the proper period a sufficient quantity of material can be delivered to the load-receiver to overload the same, and in conjunction with such organization load-reducing means are preferably provided for effecting the removal from the load-receiver of the surplus or overcharge, the remaining material constituting the true load and being suitably discharged at a predetermined time.

Another object is to provide weighing mechanism comprehending a suitable load-receiver, a counterpoise weight or weights, a flexible connector between said weight or weights and the load-receiver, and a guide for said connector, such organization being capable of ready assemblage for operation without the necessity of employing skilled labor for the purpose.

A further object is to provide load-receiving means, including a load-receiver having a discharge-outlet and a closer for the outlet, and a load-supporter situated in the load-receiver and operative simultaneously with the closer, said load-supporter being adapted to sustain the weight of the greater portion of the mass in the load-receiver, so that the closer, which is in the nature of an auxiliary load-supporter and controls the passage of the material from the discharge-outlet, can be held in its shut position by a minimum expenditure of power.

In the drawings accompanying and forming part of this specification.

Similar characters designate like parts in all the figures of the drawings.

The framework for sustaining the various parts of the machine may be of any suitable structure, it consisting in the present case of the hollow or chambered base or bed 2, the side frames 3 and 4, which are mounted thereon, and the brackets 5 and 6, which extend oppositely from the supply-hopper H, said parts being connected together in any well-known manner, and the supply-hopper constituting a convenient means for overloading the load-receiver of the weighing mechanism.

The weighing mechanism in the present case embodies or includes as a part thereof a suitable receiver, as G, mounted for reciprocation beneath the supply-hopper H, and a suitable counterpoise weight or weights, as W and W', the latter being of a mass equaling the weight of the load-receiver and the predetermined charge to be made up therein, said weights being adapted when in their normal positions to rest upon suitable stops, as 7 and 8, projecting laterally from the base 2.

The two weights are preferably suspended from connectors, as C and C', which are in the form of flexible bands or straps, said connectors being secured at their opposite ends to the load-receiver. The connector or band C is fastened at its opposite ends by suitable means to the brackets 12 and 13 on one end of the load-receiver, the opposite ends of the other connector or band C' being likewise fixed to corresponding brackets 14 and 15 on the opposite end of the load-receiver, said brackets being joined to the load-receiver by some suitable holding means.

The guides for the two connectors may be of any suitable character, they being represented herein consisting of a series of pulleys or wheels, preferably curved, for the reception of said connectors and carried upon the framework for rotation, the guide-wheels for the connector or band C being designated by 16 and 17, while the others are indicated by 18 and 19, the several supporting-shafts for the guide-wheels being designated, respectively, by 20, 21, 22, and 23, and said shafts are journaled in suitable bearings on the end frames 3 and 4, respectively. The weights W and W' depend from the two connectors or bands C and C', said weights being furnished with the rollers 24 and 25, mounted for rotation between suitable ears formed on the upper faces of the two weights, said rollers depending from the two connectors which are in peripheral contact with their respective guide-pulleys.

The weighing mechanism, which, it will be evident, consists of a load-receiver, a counterpoise weight or weights, a flexible connector, and a suitable guide or guides for the connector, can be readily set up for operation in a very short space of time by unskilled labor, and it will be apparent that said weighing mechanism occupies a comparatively small amount of space, which is an important consideration, particularly in a machine for weighing material in very large lots or quantities.

For the purpose of securing a uniform action of the two weights W and W' as they vertically reciprocate during the operation of the machine instrumentalities are provided for assuring the simultaneous ascent and decent of said weights, and the means herein represented for this purpose will now be described.

Figure 1:
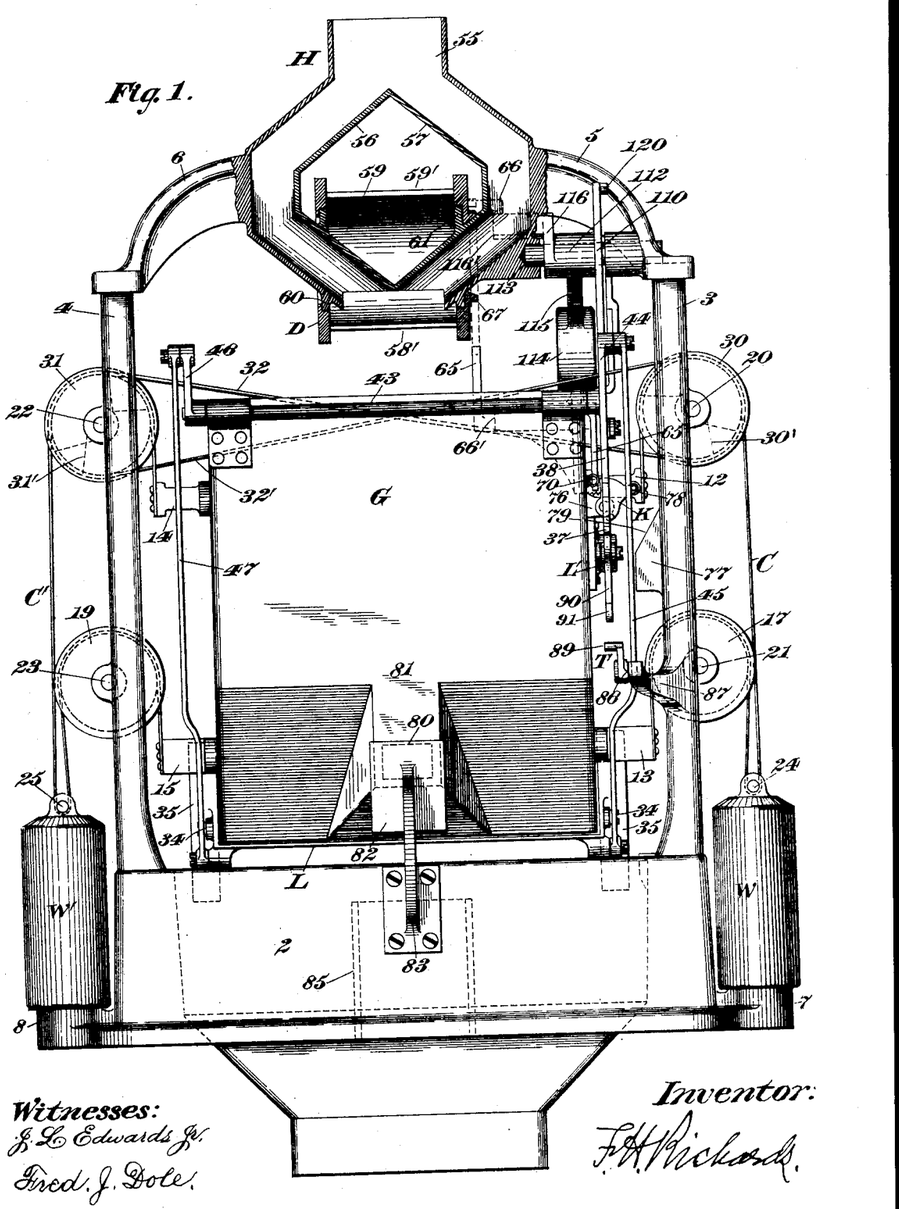
Figure 1 is a front elevation of my improved weighing-machine, the supply apparatus thereof being in longitudinal central section.
Figures 2, 5, 7, 8, 9:
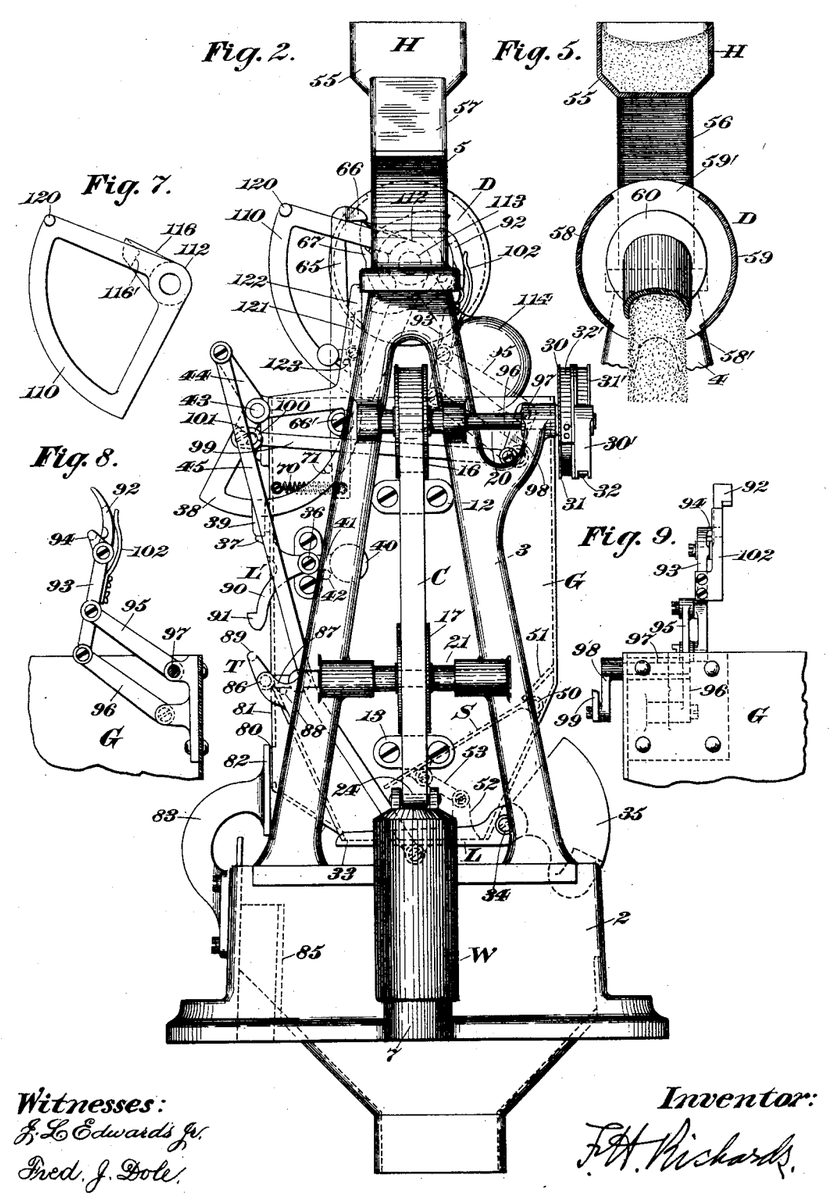
Figs. 2, 3, and 4 are side elevations of the machine, as seen from the right in Fig. 1, showing the positions occupied by the parts at three different stages in their operation, portions being broken away in Figs. 3 and 4 more clearly to show certain features of the invention.
Figs. 5 and 6 are sectional side elevations of a portion of the supply apparatus in two different positions.
Figs. 7, 8, and 9 are detail views hereinafter more particularly described.
Figures 3, 6:
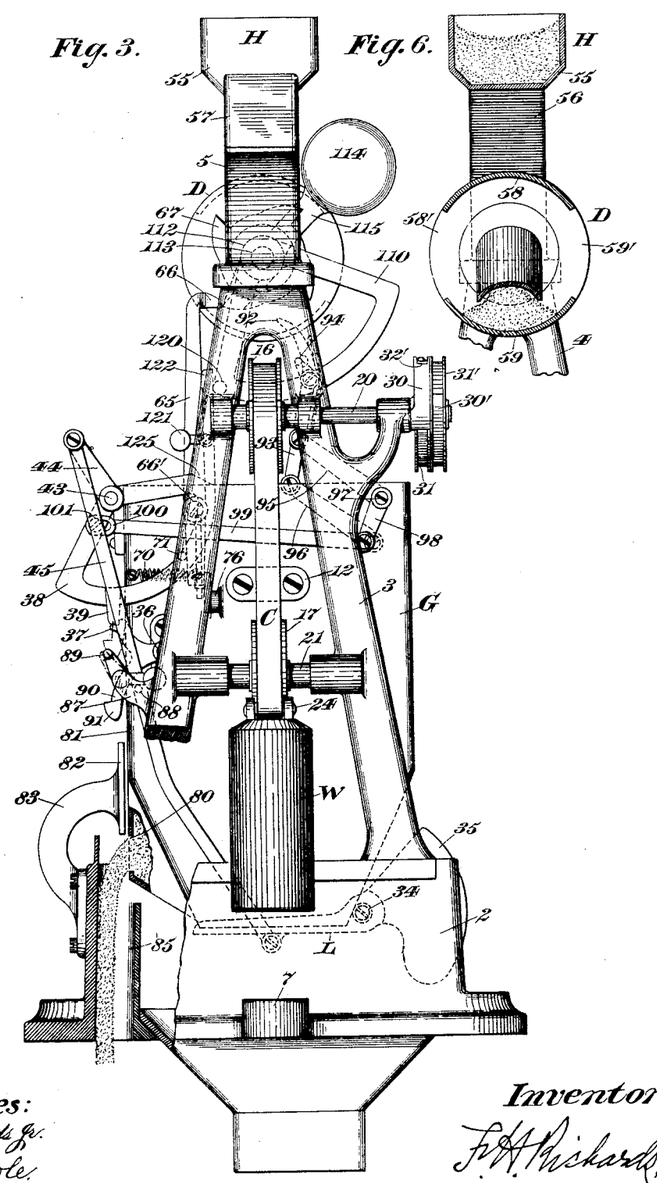

The two shafts 20 and 22, which carry the guide-pulleys 16 and 18, are comparatively long, as represented most clearly in Figs. 2 and 3, and the shaft 20 has secured thereto the grooved and oppositely-disposed segments 30 and 30', the shaft 22 being furnished with similar segments 31 and 31', respectively, the segment 31 being connected by the band 32 with the segment 30', and the segment 30 being connected with the segment 31 by the transversely-disposed band 32', said bands being secured to the respective segments in some suitable manner, whereby as the weights W and W' move in one direction during the operation of the machine the band 32 will hold the oppositely-disposed band 32' against flexure, and vice versa on the opposite movement of said weights, so that the simultaneous action of the latter, as they reciprocate, is assured.

The load-receiver G has the usual discharge-outlet, through which the loads of material can intermittingly pass, and said discharge-outlet is designated by 33, it being formed in the lower end of the load-receiver and being normally covered by a closer, such as L, the latter consisting of a flat plate pivoted at 34 to said load-receiver and counterweighted, as at 35, the object of the counterweight or counterweights being to return the closer to its shut position on the discharge of a load.

The means for governing the discharge of a load includes as a part thereof a latch, such as L', the latter consisting of a lever pivoted, as at 36, near the upper end of the load-receiver and having its arm 37, adapted to engage a suitable member, as the rocker 38 or the lug 39 on said rocker, when the closer is shut, as indicated in Fig. 2. The arm 37 of the latch L' is caused to engage the coöperating rocker 38 or its lug 39 by the action of the counterweight 40 on the arm 41 of the latch, said arm resting normally on a stop, as 42, fixed to the load-receiver. The rocker 38 is secured to the transverse rock-shaft 43, mounted suitably near the upper forward side of the load-receiver, said rocker having a crank-arm 44, to which is pivoted the rod 45, likewise connected to the closer L. The shaft 43 has at its opposite end the crank-arm 46, which is connected with the closer by the longitudinal rod 47, which moves in parallelism with the rod 45.

In conjunction with the closer L, I provide a load-supporter which is adapted to sustain the mass or the greater part thereof in the load-receiver, whereby the latter can be held against movement by a minimum amount of power.

Figure 4:
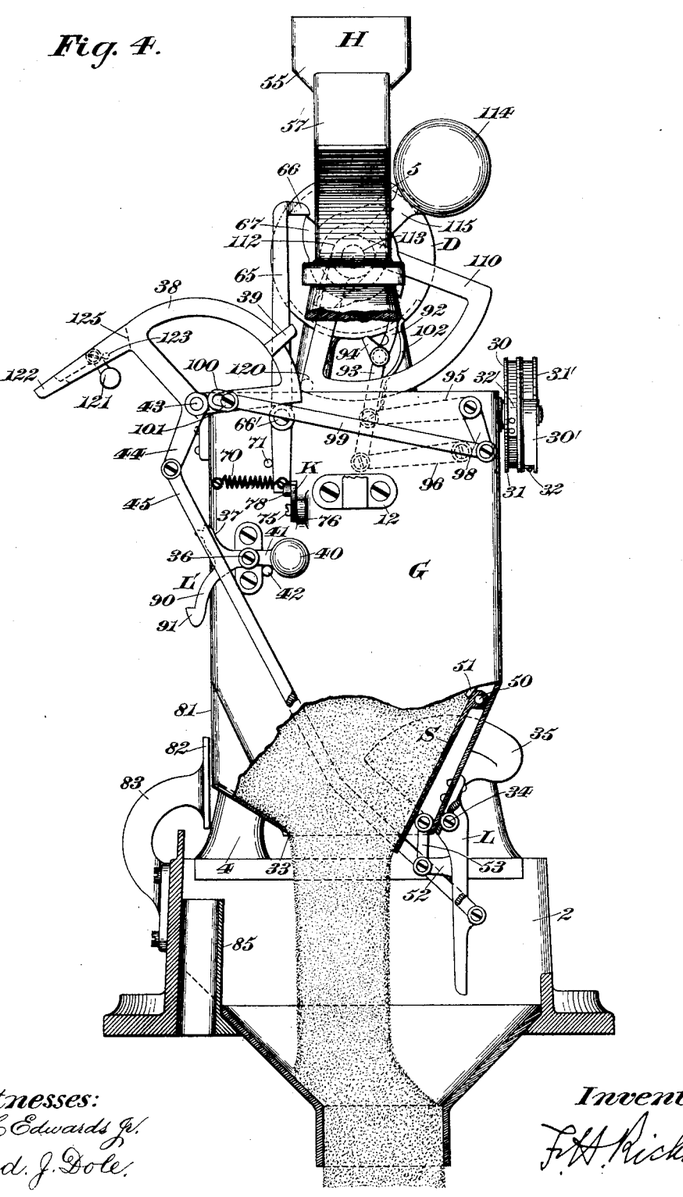

The load-supporter is designated by S, and it is represented in Fig. 4 consisting of a flat plate pivoted, as at 50, at a point above the closer and having its pivot protected by the overhanging oblique guard 51, that projects from the inner wall of the load-receiver, said load-supporter being movably mounted for simultaneous action with the closer and being preferably connected therewith.

The closer is represented having at a suitable point thereon the upright arm 52, to which is pivoted the link 53, likewise connected with the under side of the load-supporter or plate S, the latter being, when the closer is shut, disposed at an inclination and being intended to support nearly the entire load, it being in the nature of a main load-supporter, and the closer L constituting an auxiliary load-supporter, as it sustains a very small part of the mass.

The hopper H consists of a main chamber 55, which communicates with a suitable source of supply, and the oppositely-disposed branches or channels 56 and 57, the outlets to which are situated in the rotary stream-controller or drum D, said stream-controller or drum having a plurality of cut-offs, as 58 and 59, designed to successively stop the passage of the material to the load-receiver G, the opposite ends of the stream-controller or drum being preferably carried by the annular bearings or disks 60 and 61 on the two branches or channels of the supply-hopper H. The cut-offs 58 and 59 are curved and form part of the periphery of the drum D, the spaces 58' and 59' between said plates serving as supply-openings, through which the material can pass from the hopper H.

The means represented for intermittently operating the drum D consists of an actuator or pawl 65, pivoted preferably to the load-receiver near its upper end, as at 66', the tooth 66 of said pawl being adapted to engage a coöperating tooth of the ratchet 67, preferably secured to one end of the drum, whereby the drum can be partially rotated on each descent of the load-receiver to carry one or the other of the two cut-offs 58 and 59 beneath the orifices of the two hopper-channels 56 and 57, respectively.

A coiled retracting-spring is shown at 70, connected, respectively, with the lower arm of the actuator or pawl 65 and also to the load-receiver, said spring holding the lower end of the pawl against the stop 71 on the load-receiver and being adapted to thrust the tooth of said pawl over and in engagement with the proper tooth of the ratchet as the empty load-receiver rises. In connection with the actuator or pawl 65, I provide a locker preferably operative when the load-receiver has nearly reached the end of its descending movement or when the tooth 66 of the pawl has nearly passed out of engagement with a coöperating tooth on the ratchet 67, said locker being adapted to prevent oscillation of the pawl when the ratchet-tooth engaged by the pawl-tooth has passed below a horizontal central line, as the tendency of said ratchet-tooth at this time is to throw the pawl-tooth out of engagement therewith, said ratchet-tooth acting substantially as a cam. By reason of the locker the necessary partial rotation of the stream-controller or drum is insured.

The locker is designated by K, and it is represented herein consisting of a dog pivoted at 75 to the lug or ear 76 on the load-receiver, the locker being coöperative with a stationary cam, as 77, secured to the inside face of the side frame 3. The locker or detent K is equipped with the antifriction-roll 78, which, when the parts have reached a predetermined point in their descent, will ride in contact with the oblique face 79 of the cam 77, so that on the continued movement of the load-receiver the locker or detent will be thrust across the inner face of the drum-actuator or pawl 65, thereby to block the action of said pawl so that the drum can be operated to carry one of its cut-offs 58 or 59 beneath the discharge-orifices of the two channels 56 and 57 of the supply-hopper.

It will be understood that my present invention comprehends the provision of overloading and load-reducing means successively effective during the weighing of a load, and that the hopper H, in conjunction with the stream-controller or drum D, constitutes a suitable means for overloading or overcharging the load-receiver G by delivering thereto a mass of material in excess of the quantity determined upon for a load.

The load-reducing means preferably consist of an opening formed at a suitable point in the load-receiver and a stationary valve adapted to coöperate therewith and normally to cover said opening, the valve wholly uncovering said opening when the load-receiver has reached the limit of its downstroke or descending stroke, so that the excess or overload can gravitate from the load-receiver into a suitable receptacle.

The load-reducing opening is designated by 80, and it is formed near the lower end of the vertical front wall 81 of the load-receiver, the load-reducing valve being designated by 82 and represented herein as a flat plate adapted to cover normally said load-reducing opening and to lie substantially against the face of the load-receiver, as represented in Figs. 2, 3, and 4, whereby said valve effectively prevents the escape of material except at the proper time. The valve 82 is secured to the curved arm or standard 83, which is suitably fastened to the base or bed 2. Said valve is illustrated in Fig. 2 completely covering the load-reducing opening 80, and the supply-opening 59' of the stream-controller or drum being opposite the discharge-outlets of the hopper-channels 56 and 57, respectively, a stream of large volume will enter the load-receiver, causing it at a certain point to descend, this action continuing until the load-receiver has received the overcharge, and as the load-receiver thus operates, the pawl 65, by coöperating with the ratchet 67, is adapted to advance the drum D to bring the cut-off 58 into position to arrest the flow of material to the load-receiver, the latter having in the interim been overcharged. When the load-receiver passes below the so-called "poising-line," the upper wall of the opening 80 will have reached a point below the adjacent valve 82, as shown in Fig. 3, whereby the overcharge can pass from the load-receiver, the material preferably entering the conduit 85, suitably secured within the base 2 near its forward side, and the material removed can be reconducted to the supply-hopper by suitable means, (not shown,) as disclosed in the Letters Patent hereinbefore alluded to. As the load-receiver rises the withdrawal of material therefrom will be progressively reduced until the stationary valve 82 entirely covers the opening 80, at which time the load-receiver will have reached the so-called "poising-line," indicating the completion of the determined load, the latter being then suitably discharged.

The tripper for the latch is designated by T, it being of the "by-pass" kind and consisting of a counterweighted lever pivoted at 86 to a projection 87 on the side frame 3, the counterweighted arm of the tripper resting on a stop, as 88, on said projection, and the working arm of the tripper having a stud 89, coöperative with the hooked arm 90 of the closer-latch L'. On the descent of the load-receiver and after it passes below the poising-line the hooked arm 90 of the latch will impinge against the stud 89 of the tripper T and force the latter to one side. On the ascent of the load-receiver and when the latter has reached the so-called "poising-line" with the proper load therein the hook 91 will impinge against the stud 89, whereby the arm 37 of the latch will be disengaged from the protuberance 39 on the rocker 38 to release the closer, which is then forced open, the load-receiver subsequently rising, when the mass is discharged therefrom, as represented in Fig. 4.

Any suitable means may be employed for imparting the necessary movement to the stream-controller on the ascent of the load-receiver to cause the supply-stream to enter said load-receiver, the means herein shown for this purpose consisting of a spring-actuated pawl connected with the closer for operation, said pawl being designated by 92, which, on the descent of the load-receiver and the advance of the stream-controller to stop the passage of material to the load-receiver, runs idly over the teeth of the ratchet 67. The pawl 92 is pivoted at its lower end to the carrier or arm 93, furnished with a stop 94 to limit the action of said pawl, the pawl-carrier having the crank-arm 95 pivoted thereto at a point intermediate its ends, the lower end of the pawl-carrier being connected to the load-receiver by the guide-link 96. The crank-arm 95 extends from the rock-shaft 97, suitably supported near the upper end of the load-receiver and carrying at its opposite end a crank-arm 98, to which is pivoted the longitudinal link 99, having a loop 100 at its other end, embracing a stud 101 on the segmental rocker 38, the purpose of the loop being to permit a certain amount of movement of the rocker without affecting the pawl 92.

As the closer is opened the rocker 38 will be swung about its axis, the stud 101, when the closer has nearly reached the end of its opening movement, impinging against the inner end of the loop 100, thrusting the link 99, and consequently the crank-arm 98, to the right and oppositely oscillating the crank-arm 95 and the pawl-carrier 93, so that the pawl 92 will be retracted to carry it into engagement with a tooth of the ratchet 67, it being understood that the load-receiver on the discharge of its contents rises to its upper position. When the closer L has almost reached its shut position, the link 99 and crank-arm 98 will be drawn to the left, and the pawl 92, by reason of its connection with the shaft 97, which is rocked by the connections with the closer, will partially rotate the ratchet 67 to bring one of the supply-openings 58' or 59' into alinement with the discharge-openings of the hopper. The spring for the pawl 92 is designated by 102, and it is suitably secured to the pawl-carrier 93, its free end acting against said pawl.

In conjunction with the supply apparatus means are provided for blocking the opening movement of the closer while the supply-stream is entering the load-receiver, the means herein represented for this purpose consisting of the coöperating stops or rockers 38 and 110, the latter being movable concentrically with the drum D and having its hub 112 fixed to the rock-shaft or pivot 113, journaled in suitable bearings on the conduit or section 57 of the hopper and bracket 5, respectively, the hub 112 being furnished with a suitable device for operating the stop 110, such operating device being shown herein as the weight 114, secured to the arm 115, extending radially from said hub. The closer-limiting stop 110 is swung in one direction by the drum-actuating pawl 65, whereby when said stop reaches a predetermined point it will release the coöperating stop 38, and it is returned to its normal position by the weight 114. The hub 112 of the stop 110 has the arm 116 fixed thereto, from which the projection 116' extends, said projection being engaged by the tooth 66 of the pawl, the tooth being made comparatively wide for this purpose, so that on the descent of the load-receiver and the advancing movement of the drum D to stop the supply thereto the stop 110 can be moved in unison with the drum to carry it to a position to release the coöperating stop 38, it being evident that while the stop 110 is disposed in the path of oscillation of the stop 38 the action of the latter is positively blocked by the other, though it can swing about its center for a very short distance.

The stop 110, near one corner thereof, is furnished with the auxiliary stop 120 in the form of a pin, coöperative with an auxiliary stop on the rocker or stop 38, the last-mentioned auxiliary stop being designated by 121 and pivoted to the arm 122 on the rocker, the counterweighted arm of the auxiliary stop or by-pass resting on a pin 123 on the supporting-arm 122.

The operation of the two coöperating stops 110 and 38 is as follows: In Fig. 2 the stop 110 is shown at the limit of its retractive movement and the tooth 66 of the pawl 65 is in engagement with the projection 116', connected with said stop, whereby on the descent of the load-receiver the stop 110 will be swung therewith, and when said stop has nearly reached the end of its working stroke the auxiliary stop 120 will impinge against and swing the by-pass 121 about its axis, as shown in Fig. 3, whereby the return movement of the stop 110 is blocked by the auxiliary stop or by-pass 121 thereon, against which by-pass the auxiliary stop 120 abuts. The by-pass is of such length as to permit the load-receiver to rise to the poising-line without permitting the return of the stop 110. Immediately on the opening of the closer the stop 38 will be swung about its center thereby and its curved face will be carried in contact with the coöperating stop 110, as represented in Fig. 4, to prevent retraction of said stop 110. When the closer has been shut and the load-receiver G has reached its uppermost position, the interlocking stop 110 can be returned to its initial position by the falling of the counterweight 114, the pin or stop 120 passing through the space between the by-pass 121 and the oblique face 125 on one end of the stop 38, as will be obvious.

The operation of the hereinbefore-described machine, briefly set forth, is as follows: Fig. 2 represents the positions occupied by the respective parts at the commencement of operation, the supply-opening 59' of the drum 59 being opposite the discharge-orifice of the two channels 56 and 57 of the supply-hopper H, whereby a stream of large volume can enter the empty load-receiver, the closer L of which is shut and held in such position by the latch L'. When a certain proportion of the predetermined load has been received, the load-receiver will descend, the material continuing to fall thereinto until said load-receiver is overloaded, at which time it will have reached a point below the so-called "poising-line." As the load-receiver descends the pawl 65 thereon is operative to rotate the ratchet 67, and consequently the drum D, to bring the cut-off 58 thereof opposite the discharge-opening of the hopper, this operation being completed, as shown in Fig. 3, at the time the load-receiver has received its predetermined charge. When the load-receiver has reached the limit of its descending movement, the stationary valve 82, as shown in Fig. 3, will uncover the load-reducing opening 80, thereby permitting the surplus or overcharge to pass into the conduit 85 within the base 2, the load-receiver on lightening being caused to ascend by the dropping of the counterweights W and W', which are connected therewith. As the lightened load-receiver rises the hooked arm 90 of the latch L' will be carried against the tripper T on the framework, so that the latch L' will be tripped to release the closer L, the latter being then opened to discharge the predetermined load into the discharge-hopper H', which is secured in the base 2. When all the material has been discharged from the closer, it will be shut by its counterweight 35, succeeding which the remaining members of the machine will be returned to their primary positions, in the manner hereinbefore set forth, to repeat the operation.

Figure 10:
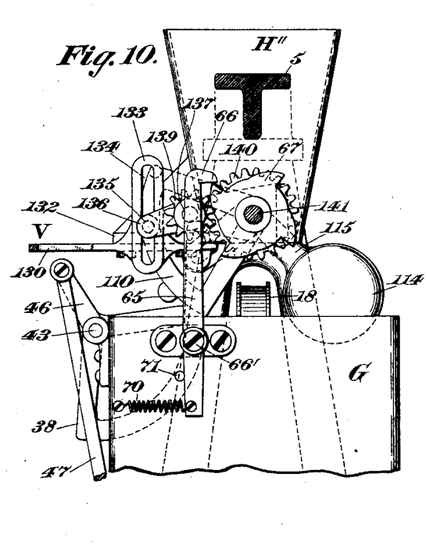
Figs. 10 and 11 are side elevations of a modified form of supply apparatus.
Figure 11:
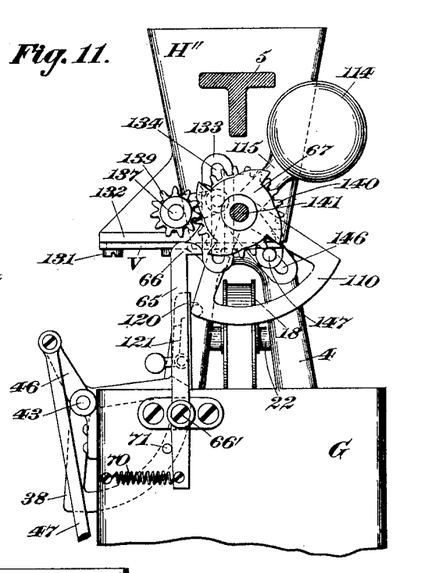
Figure 12:
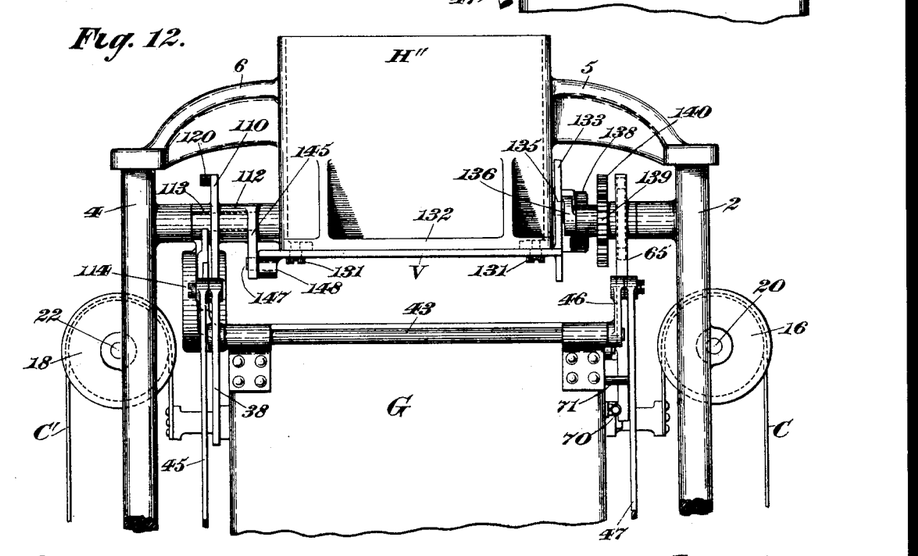
Fig. 12 is a rear view of the same, portions of the framework and weighing mechanism being shown in said figures.

In Figs. 10, 11, and 12 I have illustrated a modification of the means employed for supplying the necessary stream to the load-receiver, and in these several views the reference-characters will be the same as used to designate corresponding parts in Figs. 1 to 9, inclusive. The hopper H'' is single chambered, it being located over the load-receiver G, and the stream-controller consists of a reciprocatory valve V, slidable beneath the outlet of the supply-hopper H'', said valve having at suitable points near its opposite edges longitudinal slots, as 130, through which slots are passed headed studs or screws 131, secured to the under side of the hopper or to the flange 132, extending rearward from said hopper. The valve V has at one side thereof the longitudinally-slotted projection or ear 133, in the slot 134 of which is disposed the pin 135 of the crank-arm 136, said crank-arm being suitably secured to the shaft 137, carried by a bracket 138 on the hopper. The shaft 137 has secured thereto the pinion 139, which meshes with a gear 140 on the shaft 141, journaled in bearings on the framework and hopper, respectively, the shaft 141 having the ratchet 67 thereon. The coöperating pawl 65 is pivoted to the load-receiver, as hereinbefore described, and operates the ratchet step by step on the movement of the load-receiver. On the descent of the load-receiver the ratchet 67 will be rotated by the pawl 65, thereby rotating the shaft 141, and consequently the gear 140, and also the pinion 139, whereby the valve V, through the intermediate connections, will be slid from its wide-open position (shown in Fig. 10) to that represented in Fig. 11 for cutting off the supply to the load-receiver G. The hub 112 of the interlocking stop is sleeved on the shaft 113, carried by suitable bearings on the framework, said hub being provided with the longitudinally-slotted extension 145, in the slot 146 of which the pin 147 on the depending lug 148 of the slide-valve V is disposed. As the weight 114 drops it is adapted to open the slide-valve by reason of its connections therewith, as will be evident.

Figures 13, 14, 15:
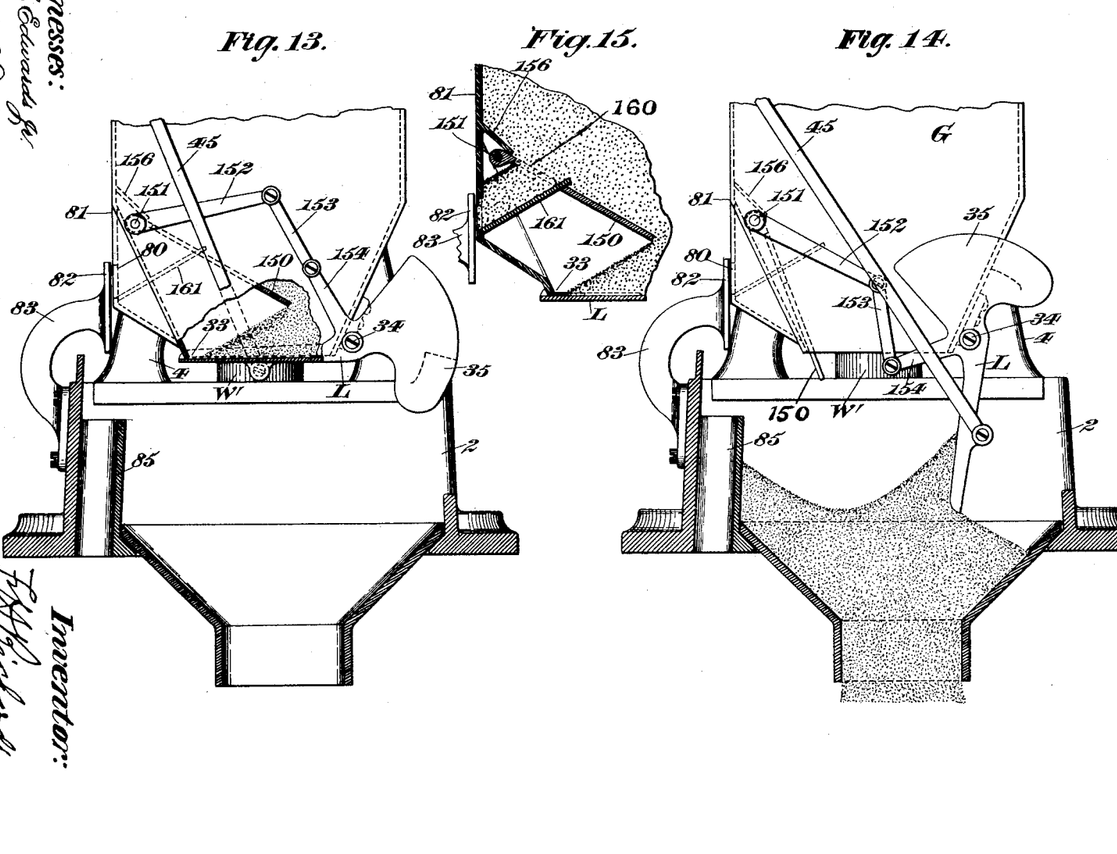
Figs. 13 and 14 are side elevations of the lower part of the weighing mechanism and the base of the machine, showing a modified form of load-supporting means.
Fig. 15 is a transverse central section of a fragment of the load-receiver and the load-supporter therein.

In Figs. 13, 14, and 15 I have illustrated a modification of the load-supporter, the same being supported above the closer L for oscillation and mounted to swing in a direction opposite to said closer. The load-supporter is designated by 150, and it is pivoted at 151, its said pivot being furnished with the crank-arm 152, connected by a link 153 with the rock-arm 154 on the closer L. When the latch that holds the closer against movement is tripped, the load-supporter 150 will be released, so that the pressure of material thereon can force it substantially against the wall of the load-receiver, as indicated in Fig. 14, the closer L simultaneously being opened to permit the load to pass from the load-receiver.

The pivot 151 of the oscillatory load-supporter is protected by the overhanging guard-plate 156, extending from the load-receiver. The load-supporter 150 has an opening or aperture 160 therein, through which the overcharge can pass toward the load-reducing opening 80, the material being conducted from the opening 160 to the load-reducing opening 80 by the director or oblique plate 161, extending from the floor of the load-receiver and for a short distance through the said opening 160.

Figure 16:
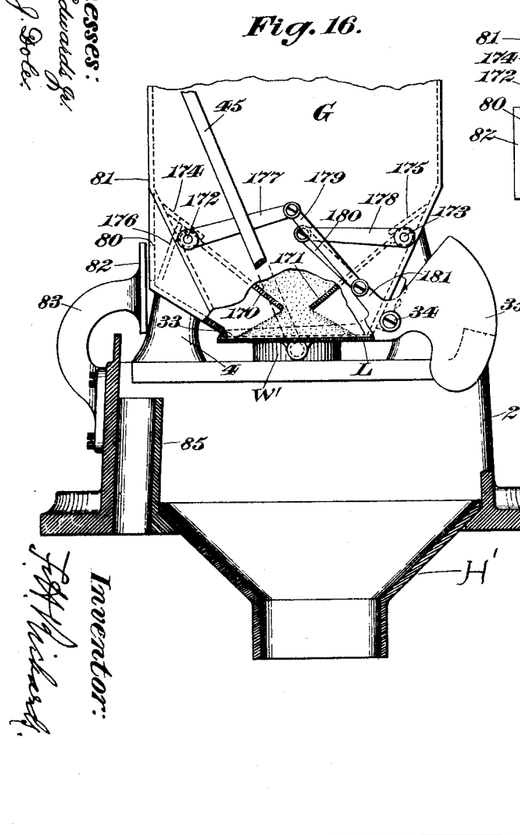
Figs. 16 and 17 are views similar to Figs. 13 and 14, showing another modified form of load-supporting means.
Figures 17, 18:
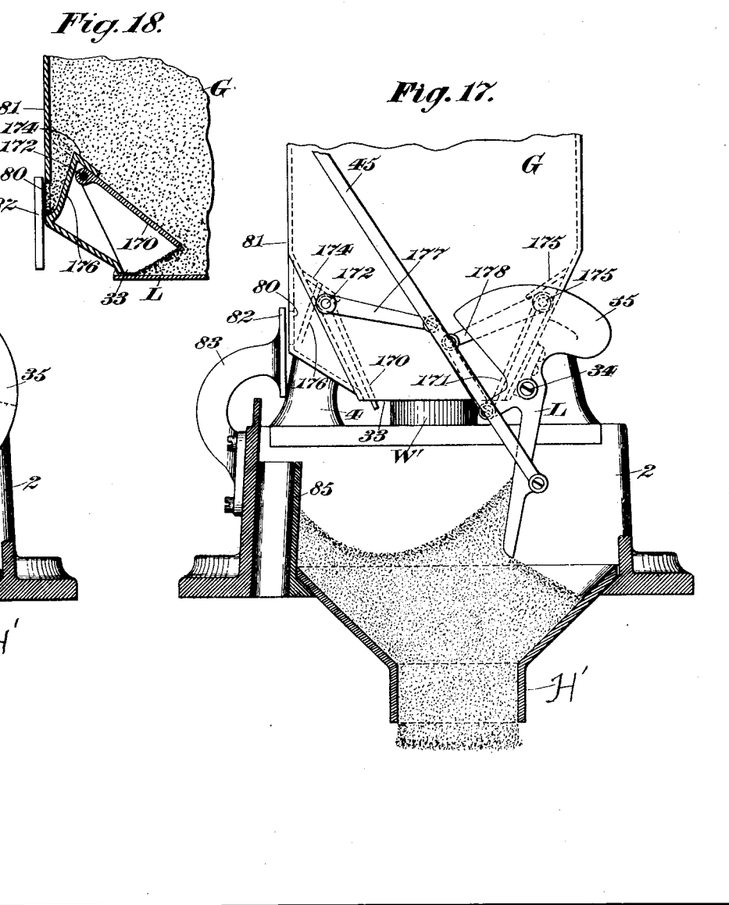
Fig. 18 is a detail view in central transverse section of a portion of the load-receiver corresponding with Fig. 15.

In Figs. 16 and 17 I have illustrated another modified form of load-supporting means, two load-supporters (designated, respectively, by 170 and 171) being provided, they being pivoted at 172 and 173, respectively, at opposite sides of the load-receiver, the pivots being protected by the guards 174 and 175, the first mentioned consisting of a flange formed on the chute-plate 176, which leads to the load-reducing opening 80, and the guard 175 extending from the load-receiver. The pivots on the two load-supporters are furnished with the crank-arms 177 and 178, connected by the links 179 and 180, respectively, with the crank-arm 181 on the closer thereof, whereby when the latch that holds the latter is tripped the two load-supporters can be released.

Having described my invention, I claim—

1. The combination, with weighing mechanism including a load-receiver, of stream-supplying means; a stream-controller; means for preventing the discharge of the load except at a predetermined time, said means including a stop supported for action independently of the stream-controller; and means connected with the load-receiver, for simultaneously advancing said stream-controller and stop.

2. The combination, with weighing mechanism including a load-receiver having a closer, of stream-supplying means; a stream-controller; a stop connected with the closer; a coöperating stop supported for action independently of the stream-controller; and a device movably mounted on the load-receiver, for simultaneously advancing said stream-controller and stop.

3. The combination, with weighing mechanism including a load-receiver having a closer, of stream-supplying means; a stream-controller; a stop connected with and operated by the closer; a coöperating stop independent in action from the stream-controller; and a device pivoted to the load-receiver and serving simultaneously to advance the stream-controller and stop.

4. The combination, with weighing mechanism, of stream-supplying means; a stream-controller; means for preventing the discharge of a load except at a predetermined time, said means including a stop supported for action independently of the stream-controller; and an actuator yieldingly supported by the weighing mechanism and operated for simultaneously advancing said stream-controller and stop.

5. The combination, with weighing mechanism, of stream-supplying means; a rotary stream-controlling drum; means for preventing the discharge of the load except at a predetermined time, said means including a stop supported for action independently of the stream-controller; and means mounted on the weighing mechanism, for simultaneously advancing said stream-controller and stop.

6. The combination, with weighing mechanism, of stream-supplying means; a stream-controller; means for preventing the discharge of the load except at a predetermined time, said means including a stop supported for action independently of the stream-controller; a ratchet connected with the stream-controller; and a device mounted on the weighing mechanism, for actuating said ratchet and stop.

7. The combination, with weighing mechanism including a load-receiver, of stream-supplying means; a stream-controller; a ratchet; and a pawl mounted on the load-receiver, for engaging said ratchet.

8. The combination, with weighing mechanism including a load-receiver, of stream-supplying means; a stream-controller; a ratchet connected to said stream-controller; a pawl for engaging said ratchet, thereby to operate the stream-controller; and a locker for said pawl.

9. The combination, with weighing mechanism including a load-receiver, of stream-supplying means; a stream-controller having a ratchet; a pawl mounted on the load-receiver; and a locker for the pawl, also mounted on said load-receiver.

10. The combination, with weighing mechanism including a load-receiver, of stream-supplying means; a stream-controller; a ratchet connected with the stream-controller; a pawl mounted to engage said ratchet, for operating the stream-controller; a locker for said pawl; and means for operating said locker.

11. The combination, with weighing mechanism including a load-receiver, of stream-supplying means; a stream-controller; a ratchet connected with said stream-controller; a pawl for operating the stream-controller by engaging said ratchet; a locker for said pawl; and means on the framework for operating said locker.

12. The combination, with weighing mechanism including a load-receiver, of stream-supplying means; a stream-controller having a ratchet; a pawl mounted to engage said ratchet; a locker for the pawl; and a cam for operating the locker.

13. The combination, with weighing mechanism including a load-receiver, of a supply-hopper having oppositely-disposed branches or channels; a stream-controller mounted for rotation on said branches; and means on the weighing mechanism, for intermittently actuating said stream-controller.

14. The combination, with weighing mechanism including a load-receiver, of a supply-hopper having oppositely-disposed branches or channels provided with bearing-disks; a drum mounted for rotation on said disks, the branches of the hopper being situated in said drum; and means on the weighing mechanism, for intermittently and partially rotating said drum.

15. The combination, with weighing mechanism including a load-receiver provided with a closer, of a stop connected with the closer; a stream-controller; a closer-limiting stop mounted for coöperation with the first-mentioned stop; means simultaneously operative for advancing the stream-controller and the closer-limiting stop; and a device, acting independent of the stream-controller, for returning said closer-limiting stop to its normal position.

16. The combination, with weighing mechanism including a load-receiver provided with a closer, of a stop connected with the closer; a stream-controller; a closer-limiting stop coöperative with the first-mentioned stop; means operative with the weighing mechanism, for simultaneously advancing the stream-controller and closer-limiting stop; and a device connected with said closer-limiting stop and operable independently of the stream-controller, for returning the same to its normal position.

17. The combination, with weighing mechanism including a load-receiver provided with a closer, of a stop connected with the closer; a stream-controller; a closer-limiting stop movable about an axis in common with the stream-controller; means operative with the weighing mechanism, for advancing the stream-controller and closer-limiting stop on the descent of the load-receiver; means connected with the closer, on the shutting thereof, for also operating the stream-controller; and a device supported for action independently of the stream-controller, for returning the closer-limiting stop to its normal position, when the stream-controller is operated by the means connected with the closer.

18. The combination, with weighing mechanism including a load-receiver provided with a closer, of stream-supplying means; a rotary stream-controller having a ratchet; a pawl mounted on the load-receiver, for operating said ratchet on the descent of the load-receiver; and a second pawl also adapted to operate the ratchet and connected with the closer, whereby, as the latter shuts, said last-mentioned pawl will receive its working stroke to rotate the ratchet.

19. The combination, with weighing mechanism including a load-receiver provided with a closer, of a hopper; a rotary stream-controller having a ratchet; a pawl mounted on the load-receiver and adapted to engage said ratchet and to operate it on the descent of the load-receiver; a second pawl also adapted to engage the ratchet; a shaft mounted on the load-receiver; crank-arms carried by the shaft, one of said crank-arms being connected with the last-mentioned pawl; and a connector between the other crank-arm and the closer.

20. The combination, with weighing mechanism including a load-receiver provided with a closer, of stream-supplying means; a rotary stream-controller having a ratchet connected thereto; a pawl mounted on the load-receiver, for engaging said ratchet to operate it on the descent of the load-receiver; a second pawl; a carrier for said pawl; a shaft having crank-arms, one of which is connected with the pawl-carrier; a stop mounted on the load-receiver and connected with the other crank-arm and also with the closer; and a second stop coöperative with the other stop.

21. The combination, with weighing mechanism including a load-receiver provided with a closer, of stream-supplying means; a stream-controller; a stop connected with the closer and having an auxiliary by-pass stop, and a second stop mounted for operation with the valve and having an auxiliary stop coöperative with the auxiliary by-pass stop.

22. The combination, with weighing mechanism including a load-receiver having a load-reducing opening, of a stationary valve supported independently of the weighing mechanism and adapted to cover and uncover said opening.

23. The combination, with weighing mechanism including a load-receiver having a load-reducing opening, of a stationary valve mounted on the framework and adapted to cover and uncover said opening.

24. The combination, with weighing mechanism including a load-receiver having a load-reducing opening, of an arm mounted on the base and having a stationary valve secured thereto, said valve being adapted to cover and uncover the load-reducing opening.

25. The combination, with weighing mechanism including a load-receiver having a load-reducing opening, of overloading means therefor; and a stationary valve adapted to cover and uncover said opening.

26. The combination, with weighing mechanism including a load-receiver having a load-reducing opening in a wall thereof, of a flat stationary plate mounted adjacent to the load-receiver and adapted to cover and uncover said opening.

27. The combination, with weighing mechanism including a load-receiver, of a series of movably-mounted load-supporters one of which is disposed in the load-receiver.

28. The combination, with weighing mechanism including a load-receiver, of a series of movably-mounted and simultaneously-operative load-supporters one of which is disposed in the load-receiver.

29. The combination, with weighing mechanism including a load-receiver having a discharge-outlet, of a closer for said outlet; and a load-supporter situated in the load-receiver and mounted for simultaneous operation with the closer.

30. The combination, with weighing mechanism including a load-receiver having a discharge-outlet, of a closer for said outlet; a load-supporter pivoted in the load-receiver and connected with the closer for operation; and a guard situated in the load-receiver over the pivot of said load-supporter.

31. The combination, with weighing mechanism including a load-receiver having a discharge-outlet and a load-reducing opening, of a closer for the outlet; a load-supporter movably mounted in the load-receiver and connected with the closer for operation, said load-supporter having an opening; a chute-plate leading from said opening in the load-supporter to the load-reducing opening; and a valve for controlling the passage of material from said load-reducing opening.

32. The combination, with weighing mechanism including a load-receiver having a discharge-outlet, of a closer connected with the load-receiver and having a rock-arm; and a load-supporter situated in the load-receiver and connected with said rock-arm.

33. The combination, with a load-receiver, of flexible connectors secured at their opposite ends to the load-receiver; counterpoise-weights suspended from the flexible connectors; guide-pulleys over which said flexible connectors are adapted to run; shafts for carrying said guide-pulleys; and connections between two of the shafts, for effecting a simultaneous movement of the counterpoise-weights.

34. The combination, with a load-receiver, of flexible connectors secured to the load-receiver at opposite sides thereof; counterpoise-weights depending from said flexible connectors; guide-pulleys over which the flexible connectors are adapted to run; shafts for supporting said guide-pulleys; oppositely-disposed segments carried by two of the shafts; and connections between said segments.

35. The combination, with weighing mechanism including a load-receiver having a load-reducing opening, of overloading means therefor; a stationary valve adapted to cover and uncover said opening; and a conduit situated below the load-reducing opening and adapted to receive the material gravitating from the load-reducing opening when the valve uncovers said opening.

FRANCIS H. RICHARDS.

Witnesses:
F. N. CHASE,
ANDREW FERGUSON.